June 17, 1930.  C. R. BUCHET  1,764,388
ELECTRIC MOTOR AND PROPELLER UNIT
Filed Jan. 28, 1930   2 Sheets-Sheet 1

INVENTOR
Conrad R. Buchet
BY
Westall and Wallace
ATTORNEYS

June 17, 1930.                C. R. BUCHET                1,764,388
                    ELECTRIC MOTOR AND PROPELLER UNIT
                        Filed Jan. 28, 1930        2 Sheets-Sheet 2

INVENTOR
Conrad R. Buchet
BY Westall and Wallace
ATTORNEYS

Patented June 17, 1930

1,764,388

UNITED STATES PATENT OFFICE

CONRAD R. BUCHET, OF LONG BEACH, CALIFORNIA, ASSIGNOR, BY DIRECT AND MESNE ASSIGNMENTS, TO ADJUSTO EQUIPMENT COMPANY, OF LOS ANGELES, CALIFORNIA, A CORPORATION OF CALIFORNIA

ELECTRIC MOTOR AND PROPELLER UNIT

Application filed January 28, 1930. Serial No. 423,980.

This invention relates to a combined motor and propeller unit, such as may be detachably mounted outboard of a boat. It contemplates a water tight housing for the motor and a propeller mounted thereon capable of being driven direct by the motor. The unit is so constructed as to be supported on an upright column attached to the boat in a manner such that the unit may be turned for steering purposes.

The objects of this invention are first, to provide a motor and propeller unit with features of construction such that it may be submerged without danger to the operating parts; and second, an assemblage of parts which is simple, easily assembled and disassembled for servicing, repair and replacement of parts, well lubricated, and providing for shielded electrical connections to the motor.

These objects together with other objects and corresponding accomplishments are obtained by means of the embodiment of my invention illustrated in the accompanying drawings, in which:—

Figure 1:
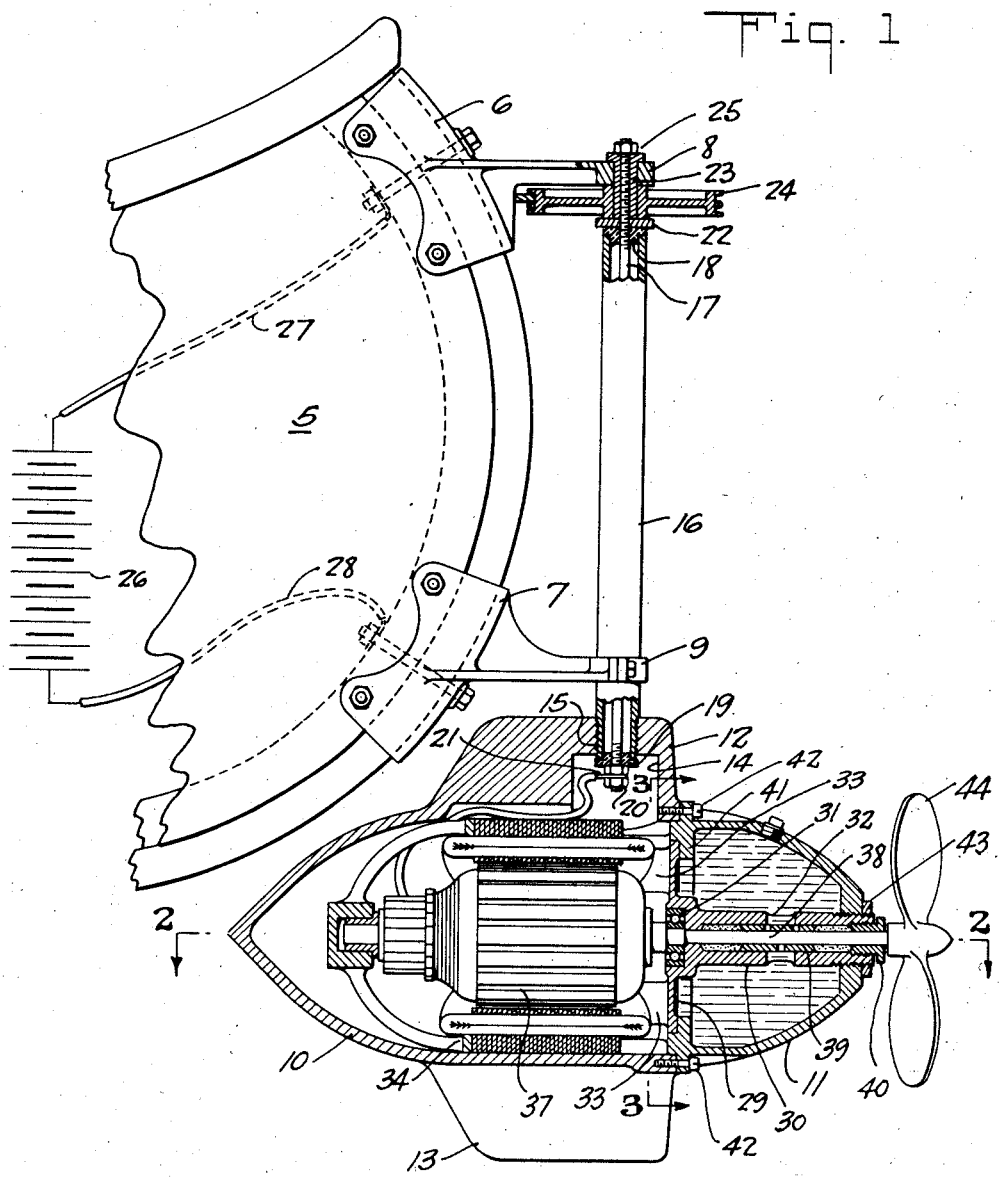
Figure 2:
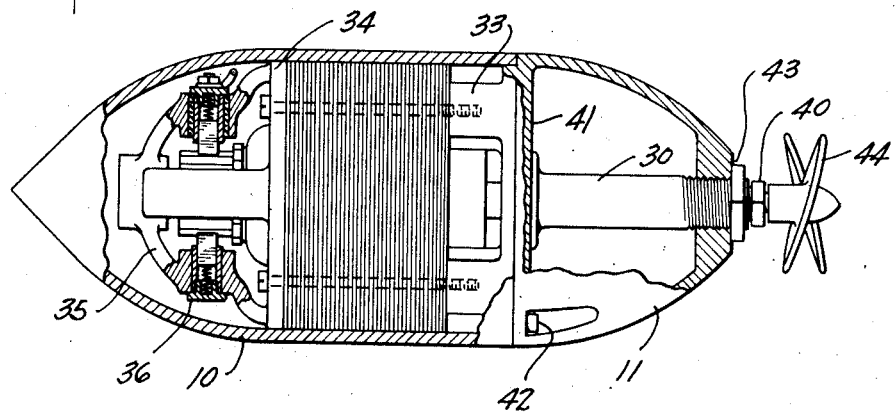
Figure 3:
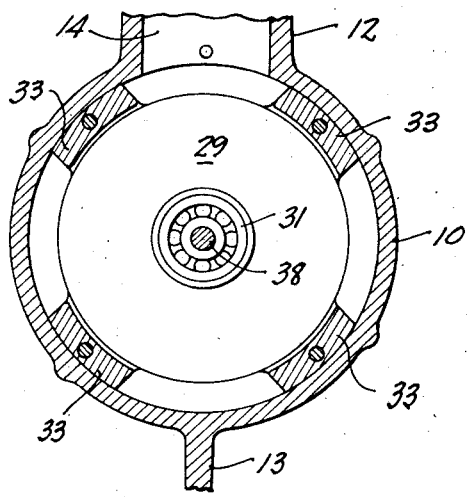

Fig. 1 is a side elevation of the stern of a canoe, a fragment being shown with my improved unit mounted thereon and shown in vertical section; Fig. 2 is a section as seen on the line 2—2 of Fig. 1, parts being shown in elevation; and Fig. 3 is a section as seen on the line 3—3 of Fig. 1.

Referring with more particularity to the drawings, 5 indicates a canoe to which are attached brackets 6 and 7. Bracket 6 has a bearing at its outer end marked 8, and bracket 7 has a split bearing marked 9 placed in line with bearing 8. The bracket serves for pivotally mounting a column which carries a housing at the lower end.

The housing comprises a fore section 10 and an aft section 11, which assembled form a torpedo like housing. The fore section has an enlargement 12 at its upper side and a keel fin 13 at its lower side. The enlargement is formed with a chamber 14. The aft rim of the fore section is provided with tapped bolt holes. A threaded opening 15 leads to the chamber 14 and is adapted to receive a tubular column member 16. Extending through the tubular member 16 is a rod 17 of conducting material and it is insulated from the member 16 by plugs 18 and 19 of suitable insulation material. A nut 20 is secured to the lower end of rod 17 so as to maintain the rod in position and provide for connection thereto of a lead 21 which is connected to one terminal of the electric motor. Mounted upon the top of plug 18 is a washer 22 and mounted upon the washer is a sleeve bushing 23 to which is secured in any suitable manner as by a press fit a sheave wheel 24. A clamp nut and washer indicated generally by 25 is mounted upon rod 17 and abuts the bushing 23. The construction is such that when the nuts 25 and 20 are set up tight, the column assemblage may be turned through the sheave wheel, by means of a tiller rope, not shown. The column member 16 and the rod 17 are electrically insulated from one another. A source of electrical energy such as a battery of cells 26 may be connected on one side through a conductor 27 to the bracket 6 and on the other side through a conductor 28 to a bracket 7. Thus through the intermediate connection, lead 21 of the motor is connected to one side of the battery and the other side of the battery is grounded to the housing.

The electric motor comprises a split frame having a lateral plate 29 which serves as a closure plate between the fore and aft chambers. Outstanding from the plate 29 is a tubular bearing 30 which is externally threaded at its outer end and and has its bore provided with an internal thread. At the inner end of the bearing is a suitable type of roller bearing 31. Lubricant openings 32 are provided in the bearing member 30 to communicate with the bore. The plate 29 comprising a lateral section of the motor frame has legs 33 to which is secured by bolts the pole or stator frame 34. The stator frame carries a bearing bracket 35 supporting a brush mounting 36. The armature or rotor of the motor marked 37 has a shaft 38 supported in the bearing of bracket 36 and in the tubular bearing 30. The outer end of the bore in bearing 30 is enlarged in diameter to receive packing, there being a perforated sleeve 39 so that lubricant may pass through openings 32 and through the perforations in sleeve 39 to the shaft. A gland nut 40 is mounted in the outer end of the bearing 30.

The aft section 11 of the housing has a ledge 41 against which the plate 29 of the motor frame rests and is arranged to form a leak tight fit therewith. The aft section 11 has bolt openings to register with the bolt openings in the fore section and bolts 42 are provided for securing the fore and aft sections together. A nut 43 is mounted upon the bearing 30 to engage a flat rear end of the aft section and clamp the motor against the aft section. A propeller 44 is mounted upon the motor shaft 38. The fore section provides a housing for the motor and the aft section a lubricant holding chamber, it being filled with oil. The motor is assembled on the aft section, the lead 21 connected to the rod 17 and then the aft section and motor assembled. Any water which gains ingress on the shaft will pass through the perforations in sleeve 39 to the lubricant chamber.

What I claim is:—

1. A propeller and motor unit for boats comprising supporting brackets to overhang the stern of the boat, a column mounted in said brackets and depending therefrom, a housing fixed to the lower end of said column with its length extending fore and aft; said housing being divided transversely to form fore and aft chamber sections, said aft chamber section having an internal ledge, means to detachably secure said fore and aft chamber sections together; a motor having a frame with a lateral plate for resting against said ledge and forming a leak tight fit between the chambers, said plate having an outstanding bearing for the motor shaft, said aft chamber section having an opening at its stern for passage therethrough of said bearing, means on said bearing engaging said aft chamber section to clamp said lateral plate against said ledge and support said motor thereon, and a propeller on said shaft.

2. A propeller and motor unit for boats comprising supporting brackets to overhang the stern of the boat, a hollow column mounted in said brackets and depending therefrom, a housing fixed to the lower end of said column; said housing being divided transversely to form fore and aft chamber sections, said aft chamber section having an internal ledge, means to detachably secure said fore and aft chamber sections together; an electric motor having a frame with a lateral plate for resting against said ledge and forming a leak tight fit between the chambers, said plate having an outstanding bearing for the motor shaft, said aft chamber section having an opening at its stern for passage therethrough of said bearing, means on said bearing engaging said aft chamber section to clamp said lateral plate against said ledge and support said motor thereon, a propeller on said shaft, a service lead for said motor extending through said column, insulated therefrom and connected to a terminal of said motor, the other terminal of said motor being grounded on said housing.

3. A propeller and motor unit for boats comprising supporting brackets to overhang the stern of the boat, a column journalled in said brackets and depending therefrom, a torpedo shaped housing fixed to the lower end of said column; said housing being divided transversely to form fore and aft chamber sections, said aft chamber section having an internal ledge, means to detachably secure said fore and aft chamber sections together; a motor having a frame with a lateral plate for resting against said ledge and forming a leak tight fit between the chambers, said plate having an outstanding bearing for the motor shaft, said aft chamber section having an opening at its stern for passage therethrough of said bearing, means on said bearing to clamp said lateral plate against said ledge and support said motor thereon, and a propeller on said shaft.

4. A propeller and motor unit for boats comprising supporting brackets to overhang the stern of the boat, a hollow column journalled in said brackets and depending therefrom, a torpedo shaped housing fixed to the lower end of said column; said housing being divided transversely to form fore and aft chamber sections, said aft chamber section having an internal ledge, means to detachably secure said fore and aft chamber sections together; an electric motor having a frame with a lateral plate for resting against said ledge and forming a leak tight fit between said chambers, said plate having an outstanding bearing for the motor shaft, said aft chamber section having an opening at its stern for passage therethrough of said bearing, means on said bearing engaging said aft chamber section to clamp said lateral plate against said ledge and support said motor thereon, a propeller on said shaft, a service lead for said motor extending through the bore of said column, insulated therefrom and connected to a terminal of said motor, the other terminal of said motor being grounded on said housing.

5. A propeller and motor unit for boats comprising supporting brackets to overhang the stern of the boat, a hollow column journalled in said brackets and depending therefrom, a torpedo shaped housing fixed to the lower end of said column; said housing being divided transversely to form fore and aft chamber sections, said aft chamber section having an internal ledge, means to detachably secure the fore and aft chamber sections together; a motor comprising a frame with a lateral plate for resting against said ledge and forming a leak tight fit between said chambers, said plate having an outstanding tubular bearing for the motor shaft, a stator frame carrying a bearing for said shaft and bolted to said plate, said aft chamber section having an opening at its stern for passage therethrough of said bearing, a lock nut on said bearing engaging said aft chamber section to clamp said lateral plate against said ledge and support said motor thereon, and a propeller on said shaft.

6. A propeller and motor unit for boats comprising supporting brackets to overhang the stern of the boat, a hollow column journalled in said brackets and depending therefrom, a torpedo shaped housing fixed to the lower end of said column; said housing being divided transversely to form fore and aft chamber sections, said aft chamber section having an internal ledge, means to detachably secure said fore and aft chamber sections together; an electric motor comprising a frame with a lateral plate for resting against said ledge and forming a leak tight fit between chambers, said plate having an outstanding tubular bearing for the motor shaft, a stator frame carrying a bearing for said shaft and bolted to said plate, said aft chamber section having an opening at its stern for passage therethrough of said bearing, a lock nut on said bearing engaging said aft chamber section to clamp said lateral plate against said ledge and support said motor thereon, a propeller on said shaft, a service lead for said motor extending through said column, insulated therefrom and connected to a terminal of said motor, the other terminal of said motor being grounded on said housing.

7. A propeller and motor unit for boats comprising supporting brackets to overhang the stern of the boat, a column mounted in said brackets and depending therefrom, a housing fixed to the lower end of said column with its length extending fore and aft said housing being divided transversely to form fore and aft chamber sections, said aft chamber section having an internal ledge, means to detachably secure said fore and aft chamber sections together; a motor having a frame with a lateral plate for resting against said ledge and forming a leak tight fit between the chamber, the fore chamber providing a motor housing and the aft chamber a lubricant chamber, said plate having an outstanding tubular bearing for the motor shaft with lubricant openings and threaded at the outer end, said aft chamber section having an opening at its stern for passage therethrough of said bearing, a nut on said bearing engaging said aft chamber section to clamp said lateral plate against said ledge and support said motor thereon, a gland packing on the outer end of said bearing about said shaft and a propeller on said shaft.

8. A propeller and motor unit for boats comprising supporting brackets to overhang the stern of the boat, a hollow column mounted in said brackets and depending therefrom, a housing fixed to the lower end of said column; said housing being divided transversely to form fore and aft chamber sections, said aft chamber section having an internal ledge, means to detachably secure said fore and aft chamber sections together; an electric motor having a frame with a lateral plate for resting against said ledge and forming a leak tight fit between the chambers, the fore chamber providing a motor housing and the aft chamber a lubricant chamber, said plate having an outstanding tubular bearing for the motor shaft with lubricant openings and threaded at its end, said aft chamber section having an opening at its stern for passage therethrough of said bearing, a nut on said bearing engaging said aft chamber section to clamp said lateral plate against said ledge and support said motor thereon, a gland packing on the outer end of said bearing about said shaft, and a propeller on said shaft; a service lead for said motor extending through said column, insulated therefrom and connected to a terminal of said motor, the other terminal of said motor being grounded on said housing.

9. A propeller and motor unit for boats comprising supporting brackets to overhang the stern of the boat, a column journalled in said brackets and depending therefrom, a torpedo shaped housing fixed to the lower end of said column; said housing being divided transversely to form fore and aft chamber sections, said aft chamber section having an internal ledge, means to detachably secure said fore and aft chamber sections together; a motor having a frame with a lateral plate for resting against said ledge and forming a leak tight fit between the chambers, the fore chamber forming a motor housing and the aft chamber a lubricant chamber, said plate having an outstanding tubular bearing for the motor shaft with lubricant openings and threaded at the outer end, said aft chamber section having an opening at its stern for passage therethrough of said bearing, a nut on said bearing to clamp said lateral plate against said ledge and support said motor thereon, a gland packing on the outer end of said bearing about said shaft, and a propeller on said shaft.

10. A propeller and motor unit for boats comprising supporting brackets to overhang the stern of the boat, a hollow column journalled in said brackets and depending therefrom, a torpedo shaped housing fixed to the lower end of said column; said housing being divided transversely to form fore and aft chamber sections, said aft chamber section having an internal ledge, means to detachably secure said fore and aft chamber sections together; an electric motor having a frame with a lateral plate for resting against said ledge and forming a leak tight fit between the chambers, the fore chamber forming a motor housing and the aft chamber a lubricant chamber, said plate having an outstanding tubular bearing for the motor shaft with lubricant openings and threaded at its outer end, said aft chamber section having an opening at its stern for passage therethrough of said bearing, a nut on said bearing engaging said aft chamber section to clamp said lateral plate against said ledge and support said motor thereon, a gland packing on the outer end of said bearing about said shaft and a propeller on said shaft, a service lead for said motor extending through the bore of said column, insulated therefrom and connected to a terminal of said motor, the other terminal of said motor being grounded on said housing.

In witness that I claim the foregoing I have hereunto subscribed my name this 10th day of January, 1930.

CONRAD R. BUCHET.